United States Patent
Nakajima et al.

(10) Patent No.: US 10,455,204 B2
(45) Date of Patent: Oct. 22, 2019

(54) DISPLAY SYSTEM AND INFORMATION PROCESSING METHOD

(71) Applicant: MAXELL, LTD., Otokuni-gun, Kyoto (JP)

(72) Inventors: Mitsuo Nakajima, Tokyo (JP); Kazuhiko Tanaka, Tokyo (JP); Haruhiko Higuchi, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/092,009

(22) PCT Filed: Apr. 12, 2016

(86) PCT No.: PCT/JP2016/061752
§ 371 (c)(1),
(2) Date: Oct. 8, 2018

(87) PCT Pub. No.: WO2017/179111
PCT Pub. Date: Oct. 19, 2017

(65) Prior Publication Data
US 2019/0110033 A1    Apr. 11, 2019

(51) Int. Cl.
*G03B 21/14* (2006.01)
*H04N 9/31* (2006.01)
(Continued)

(52) U.S. Cl.
CPC ......... *H04N 9/3185* (2013.01); *G03B 21/147* (2013.01); *G06K 9/036* (2013.01);
(Continued)

(58) Field of Classification Search
CPC .... G03B 21/14; G03B 21/147; H04N 9/3185; H04N 9/3182; H04N 5/225; H04B 1/3833
See application file for complete search history.

(56) References Cited

U.S. PATENT DOCUMENTS

| | | |
|---|---|---|
| 2014/0176730 A1 | 6/2014 | Kaji et al. |
| 2015/0029465 A1 | 1/2015 | Ishikawa et al. |

(Continued)

FOREIGN PATENT DOCUMENTS

| | | |
|---|---|---|
| JP | 2009-206798 A | 9/2009 |
| JP | 2010-266714 A | 11/2010 |

(Continued)

*Primary Examiner* — William C. Dowling
(74) *Attorney, Agent, or Firm* — Volpe and Koenig, P.C.

(57) ABSTRACT

A display system includes: a video display apparatus; and a mobile terminal that communicate with each other. The video display apparatus includes: a measurement pattern generator that generates a plurality of measurement patterns; a projection unit that projects the measurement patterns; a first transceiver that communicates with the mobile terminal to receive information regarding distortion correction of video; and a distortion corrector that corrects the distortion. The mobile terminal includes: a camera unit that photographs the projected measurement patterns; a controller that generates the distortion correction information based on the photographed measurement patterns; and a second transceiver that communicates with the first transceiver to transmit the distortion correction information to the video display apparatus. The measurement pattern generator adds a common pattern to each measurement pattern, which indicates a reference position of each of the measurement patterns. The controller generates the distortion correction information based on the common pattern.

12 Claims, 12 Drawing Sheets

(51) Int. Cl.
*G06K 9/03* (2006.01)
*H04B 1/3827* (2015.01)
*H04N 5/225* (2006.01)
*H04N 5/74* (2006.01)

(52) U.S. Cl.
CPC ............ *H04N 5/225* (2013.01); *H04N 5/74* (2013.01); *H04N 9/31* (2013.01); *H04N 9/3182* (2013.01); *H04B 1/3833* (2013.01); *H04N 5/2257* (2013.01)

(56) References Cited

U.S. PATENT DOCUMENTS

| | | | | |
|---|---|---|---|---|
| 2015/0138512 | A1* | 5/2015 | Nagao | H04N 9/3185 353/69 |
| 2018/0241978 | A1* | 8/2018 | Hirota | H04N 5/74 |
| 2019/0137854 | A1* | 5/2019 | Sugaya | G03B 21/14 |

FOREIGN PATENT DOCUMENTS

| | | |
|---|---|---|
| JP | 2013-168922 A | 8/2013 |
| JP | 2013-192098 A | 9/2013 |
| JP | 2015-026914 A | 2/2015 |
| JP | 2015-026992 A | 2/2015 |

* cited by examiner

FIG. 6
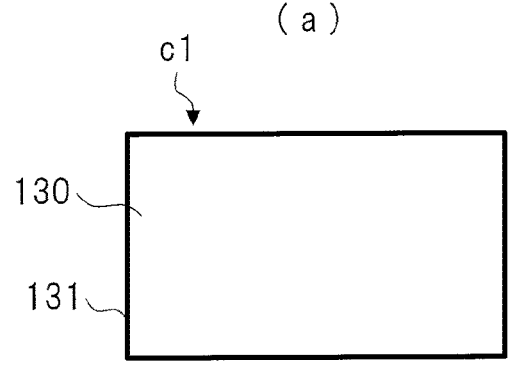
(a)
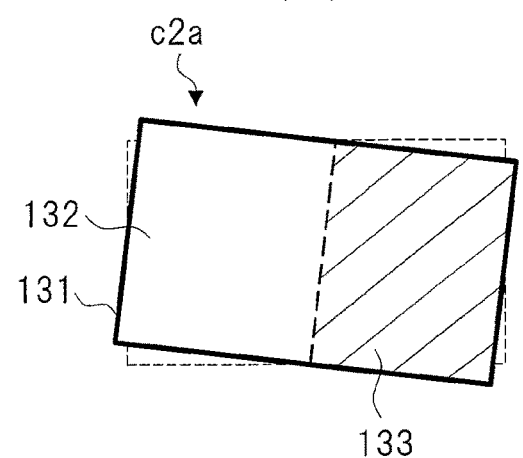
(b)
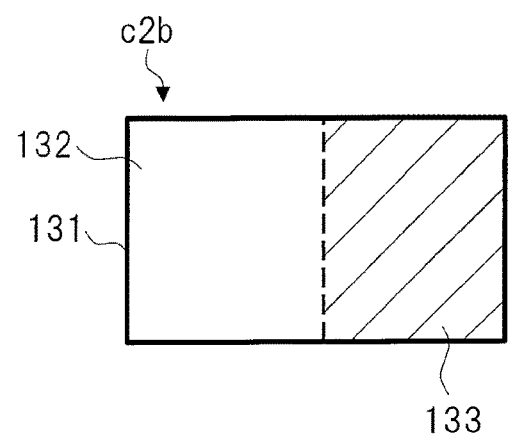
(c)

FIG. 7
(a)
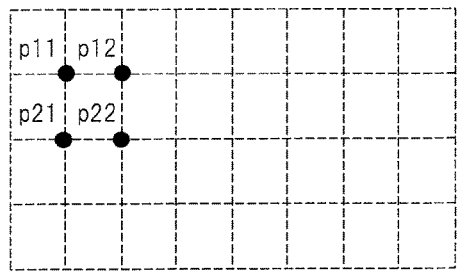
(b)
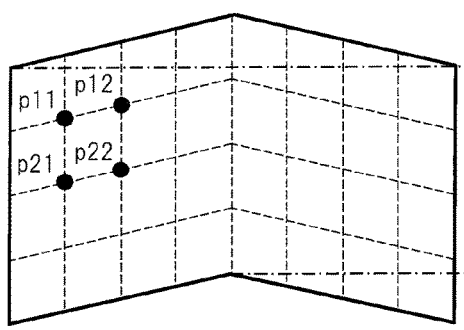
(c)
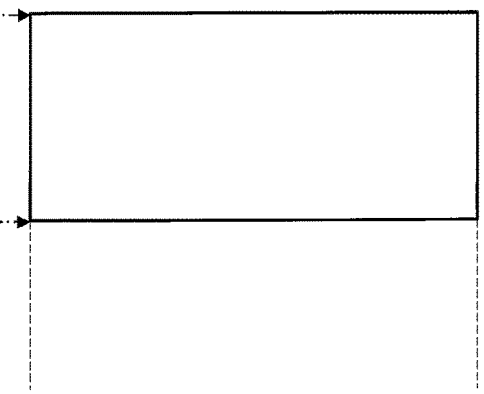
(d)
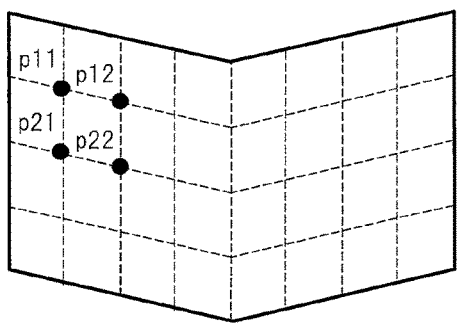
(e)
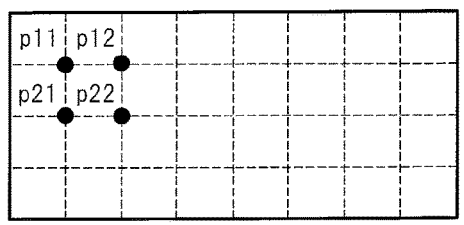

DISPLAY SYSTEM AND INFORMATION PROCESSING METHOD

TECHNICAL FIELD

The present invention relates to a display system and an information processing method, and particularly, the present invention relates to a technique effective for distortion correction of a projection video.

BACKGROUND ART

A projector causes a video apparatus such as liquid crystal to transmit light from a light source to provide an image on a desired screen or the like. Thus, distortion may occur in the projected video in a case where a direction of the light from the light source is caused to face the screen.

For this reason, it is necessary that arrangement of the projector and the screen is generally adjusted so as not to distort the projected video when to install them. Alternatively, it is necessary to adjust distortion of displayed video by using a distortion correcting function or the like of the projector.

On the other hand, a technique called as projection mapping is attracting attention in recent years. In the projection mapping, video is projected to an object placed in the real world by using a video projecting apparatus such as a projector.

In the projection mapping, it is necessary to project video not only to a flat screen caused to face the projector, but also to a screen that is not caused to face the projector and is placed with a predetermined angle or an object with concavities and convexities.

As described above, in a case where a projection target such as a screen is not caused to face the projector, that is, in a case where an optical axis of the projector and a surface of the projection target cross at right angles with each other, geometric distortion occurs in the projected video.

For example, in a case where a screen is installed so that an upper side of the screen is near the projector and a lower side thereof is far from the projector and video with a square shape is projected from the projector, so-called trapezoidal distortion occurs in which the video is projected so that the upper side of the square is shorter than the lower side thereof.

In fact, the similar phenomenon occurs not only in a vertical direction, but also in a horizontal direction. Thus, the video with a quadrangle, which is projected from the projector, is projected as a distorted square that does not have parallel sides.

In this case, by applying geometric correction of a reverse direction to video to be projected so as to counteract this distortion in advance, it becomes possible to correctly display the video as a square. This geometric correction, that is, the geometric conversion is called as perspective conversion or projective conversion, and can be realized by matrix calculation. In order to calculate this matrix, it is necessary to obtain information on a shape and a position of a projected object by any means.

One technique for realizing this is described in Japanese Patent Application Publication No. 2013-192098 (see Patent Document 1), for example. This Patent Document describes that: a marker becoming a reference is projected from a projector; a shape of a projection target is obtained by photographing the projection target by a camera of a smartphone; distortion is calculated from obtained video; and the distortion is subjected to reverse correction.

RELATED ART DOCUMENTS

Patent Documents

Patent document 1: Japanese Patent Application Publication No. 2013-192098

SUMMARY OF THE INVENTION

Problems to be Solved by the Invention

The technique of Patent Document 1 described above is that markers are displayed at four points on a screen. In this case, it is possible to detect and correct even distortion on the screen, for example, trapezoidal distortion that occurs due to a state that a projection plane is not caused to face a projector. However, it is impossible to detect a shape of a projection plane with minute concavities and minute convexities, for example.

In order to detect the projection plane with minute concavities and minute convexities, it is necessary to project plural kinds of correction video in which fineness of the markers is changed and photograph the correction video each time by a camera. However, there is a problem that a shape of a projection plane cannot be obtained correctly. This is because a position of correction video photographed by an unfixed camera such as one in a smartphone is changed while photographing multiple times due to influence of camera shake or the like.

It is an object of the present invention to provide a technique capable of realizing distortion correction of a video more suitably.

The foregoing and other objects, and new features of the present invention will become more apparent from the detailed description of the present specification and the appending drawings.

Means for Solving the Problem

An outline of representative invention of the present invention disclosed in the present application will briefly be explained as follows.

Namely, a representative display system includes a video display apparatus, and a mobile terminal configured to communicate with the video display apparatus. The video display apparatus includes a measurement pattern generator, a projection unit, a first transceiver, and a distortion corrector.

The measurement pattern generator is configured to generate a plurality of measurement patterns. The projection unit is configured to project the plurality of measurement patterns generated by the measurement pattern generator. The first transceiver is configured to communicate with the mobile terminal to receive information regarding distortion correction of video from the mobile terminal. The distortion corrector is configured to correct distortion of the video projected by the projection unit on a basis of the information regarding the distortion correction of the video, which is received from the mobile terminal.

Further, the mobile terminal includes a camera unit, a controller, and a second transceiver. The camera unit is configured to photograph the plurality of measurement patterns projected by the projection unit. The controller is configured to generate the information regarding the distortion correction of the video on a basis of the plurality of measurement patterns photographed by the camera unit. The second transceiver is configured to communicate with the first transceiver to transmit, to the video display apparatus, the information regarding the distortion correction of the video, which is generated by the controller.

The measurement pattern generator is configured to add a common pattern to each of the plurality of measurement patterns, the common pattern indicating a reference position of each of the measurement patterns. The controller is configured to generate the information regarding the distortion correction of the video on a basis of the common pattern added to each of the plurality of measurement patterns.

In particular, a change in an imaging position of an image of each of the plurality of measurement patterns photographed by the camera unit is compensated in the controller by using the common pattern added by the measurement pattern generator.

Moreover, the mobile terminal includes a common pattern processor and a display. The common pattern processor is configured to generate a menu that allows luminance, color, and a position of the common pattern to be selected therethrough. The display is configured to display the menu generated by the common pattern processor.

The measurement pattern generator is configured to change the common pattern in accordance with a selection result of the menu received by the mobile terminal.

Effects of the Invention

Effects obtained by representative invention of the present invention disclosed in the present application will briefly be explained as follows.

It is possible to realize correction of a video with high accuracy.

BRIEF DESCRIPTIONS OF THE DRAWINGS

FIG. 6 is an explanatory drawing showing one example of correction of a video reference position in a process at Step S204 in FIG. 5;

FIG. 7 is an explanatory drawing showing one example of a process at Step S205 in FIG. 5;

DETAILED DESCRIPTION OF PREFERRED EMBODIMENTS

Figure 1:
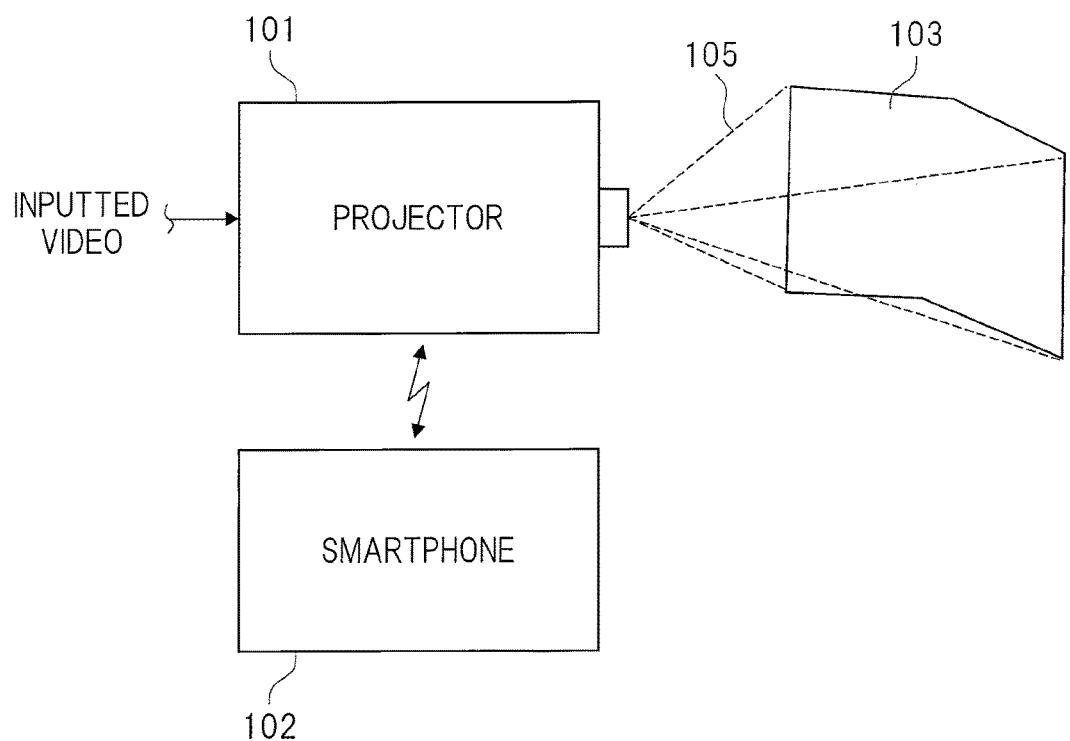
FIG. 1 is an explanatory drawing showing one example of a configuration of a video display system according to a first embodiment.

In embodiments described below, the invention will be described in a plurality of sections or embodiments when required as a matter of convenience. However, these sections or embodiments are not irrelevant to each other unless otherwise stated, and the one relates to the entire or apart of the other as a modification example, details, or a supplementary explanation thereof.

Further, in the embodiments described below, in a case of referring to the number of elements (including number of pieces, values, amount, range, and the like), the number of the elements is not limited to a specific number unless otherwise stated or except the case where the number is apparently limited to a specific number in principle, and the number larger or smaller than the specified number may also be applicable.

Moreover, in the embodiments described below, it goes without saying that the components (including element steps and the like) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Further, the same components are in principle denoted by the same reference numeral throughout the drawings for describing the embodiments, and the repetitive description thereof will be omitted.

Hereinafter, the embodiments will be described in detail.

First Embodiment

Configuration Example of Video Display Apparatus

FIG. 1 is an explanatory drawing showing one example of a configuration of a video display system according to a first embodiment.

As shown in FIG. 1, the video display system includes a projector 101, a smartphone 102, and a screen 103. The projector 101 that is a video display apparatus carries out video processing for inputted video to project the video on the screen 103. Here, a light ray 105 shown by dotted lines of FIG. 1 indicates a direction of a light ray projected by the projector 101.

The projector 101 and the smartphone 102 are allowed to communicate with each other by means of a communication function by wireless, for example. A communication technology between the projector 101 and the smartphone 102 may be any wireless communication technology such as Wi-Fi or Bluetooth.

Configuration Example of Projector

Next, configurations of the projector 101 and the smartphone 102 will be described below.

Figure 2:
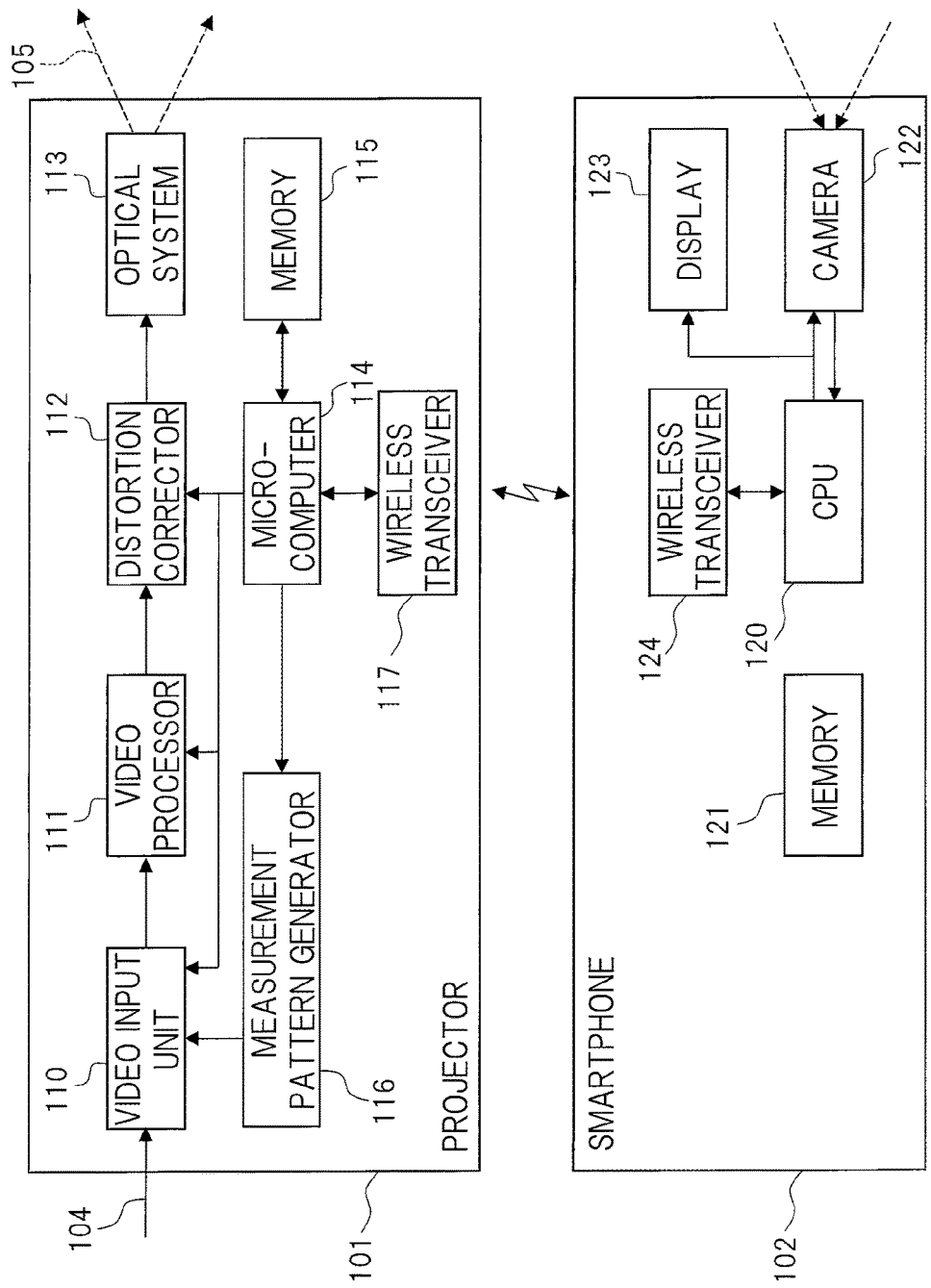
FIG. 2 is an explanatory drawing showing one example of configurations of a projector and a smartphone included in the video display system shown in FIG. 1.

FIG. 2 is an explanatory drawing showing one example of configurations of the projector 101 and the smartphone 102 included in the video display system shown in FIG. 1.

A configuration of the projector 101 will first be described. The projector 101 includes a video input unit 110, a video processor 111, a distortion corrector 112, an optical system 113, a microcomputer 114, a memory 115, a measurement pattern generator 116, and a wireless transceiver 117.

The video input unit 110 converts the inputted video outputted from a personal computer or the like into an inner video format, for example. The inputted video is video with any of various kinds of video formats such as an HDMI (High-Definition Multimedia Interface) or a Display Port. Further, the inner video format is a general RGB (red, green, and blue), a YUV format, or the like, and it is not limited particularly.

An inner video signal processed by the video input unit 110 is inputted into the video processor 111. The video processor 111 executes video correction. As the video correction, there are contrast correction, color correction, and the like, for example.

The distortion corrector 112 carries out distortion correction and the like of video in horizontal and vertical directions with respect to the video signal processed by the video processor 111. The video signal is then converted into light and projected via the optical system 113. The distortion corrector 112 corrects distortion of the video by using a distortion correction coefficient (will be described later).

The optical system 113 that becomes a projection unit includes a light source. The optical system 113 converts the video signal into light by means of a video apparatus such as a liquid crystal, or DLP (Digital Light Processing) and outputs the converted video signal. The method thereof is not limited particularly.

Programs for controlling the whole projector 101 and the like are stored in the memory 115. The microcomputer 114 controls the projector 101 on the basis of the program stored in the memory 115.

The measurement pattern generator 116 generates a stripe pattern that is a measurement pattern to measure a shape of a projection plane (will be described later). The wireless transceiver 117 that is a first transceiver carries out wireless communication with a wireless transceiver 124 (will be described later) included in the smartphone 102.

Configuration Example of Smartphone

Subsequently, a configuration of the smartphone 102 will be described.

The smartphone 102 includes a CPU 120, a memory 121, a camera 122, a display 123, and a wireless transceiver 124. The memory 121 stores therein programs, a distortion correcting application (will be described later), photograph data photographed by the camera 122, and the like.

The CPU 120 that functions as a controller and a common pattern processor controls the entire smartphone 102 on the basis of the programs stored in the memory 121. The camera 122 photographs video.

The wireless transceiver 124 that is a second transceiver carries out wireless communication with the wireless transceiver 117 of the projector 101. The display 123 is a display, and is configured by a liquid crystal display, for example.

In this regard, with respect to a configuration of the smartphone 102, the smartphone 102 does not require a special configuration particularly, and may be provided with the functions described above. Thus, the smartphone 102 is not limited to a smartphone, and may be a Personal Digital Assistant (PDA) or the like that is illustrated by a tablet terminal, for example.

First Example of Stripe Pattern

Figure 3:
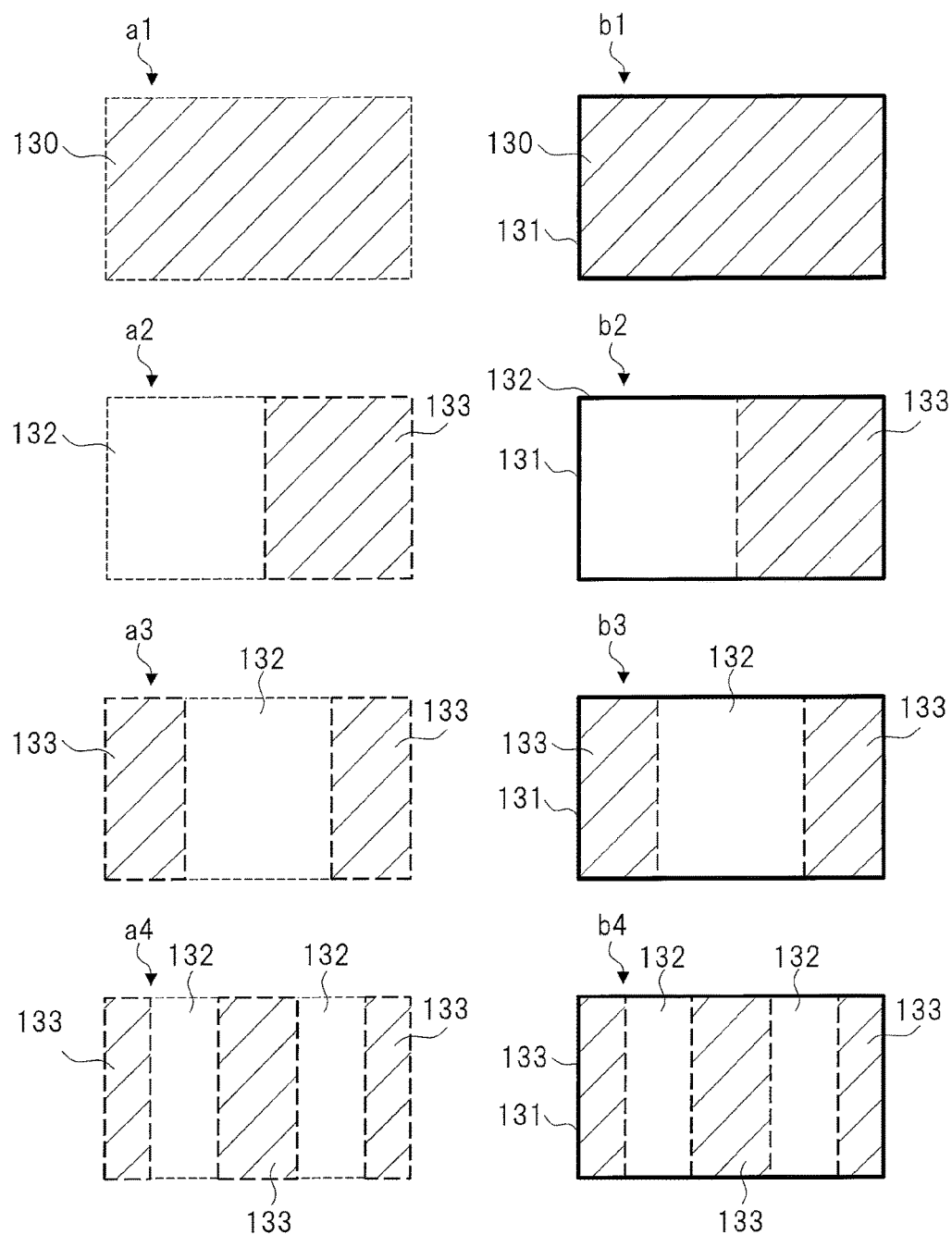
FIG. 3 is an explanatory drawing showing one example of stripe patterns that are generated by a measurement pattern generator included in the projector shown in FIG. 2.

FIG. 3 is an explanatory drawing showing one example of stripe patterns that are generated by the measurement pattern generator 116 included in the projector 101 shown in FIG. 2.

First, stripe patterns a1 to a4 shown at a left side of FIG. 3 are shown as one example of the stripe patterns in a vertical direction.

The stripe pattern a1 shown at the upper left of FIG. 3 is formed by a region 130 shown by a dotted line in FIG. 3. The entire video is displayed in the region 130 by white or high luminance. Hatching in the region 130 indicates that the video is displayed by the white or high luminance. Hereinafter, in FIG. 3, hatching in each of regions indicates that video is displayed by white or high luminance.

Further, in the stripe pattern a2 shown under the stripe pattern a1, the entire video is formed by a region 132 shown by a dotted line and a region 133 shown by a thick dotted line. The region 133 occupies right half of the video, and is white or high luminance. A white blank in the region 132 occupies left half of the video. The region 132 that occupies the left half of the video indicates to be black or low luminance. Hereinafter, in FIG. 3, a white blank in each of regions indicates that video is displayed by black or low luminance.

In the stripe pattern a3 shown under the stripe pattern a2, the entire video is formed by one region 132 shown by a dotted line and two regions 133 each shown by a thick dotted line. The two regions 133 respectively formed at right and left ends of the video indicate to be white or high luminance, while the region 132 sandwiched by the right and left regions 133 indicates to be black or low luminance.

In the stripe pattern a4 shown under the stripe pattern a3, the entire video is formed by two regions 132 each shown by a dotted line and three regions 133 each shown by a thick dotted line. The regions 133 positioned at right and left ends and a central portion of the video indicate to be white or high luminance, while the region 132 sandwiched by the left and central regions 133 and the region 132 sandwiched by the right and central regions 133 indicate to be black or low luminance.

Subsequently, stripe patterns b1 to b4 shown at a right side of FIG. 3 are formed by adding a common pattern region 131 to each of the stripe patterns a1 to a4 shown at the left side of FIG. 3. The common pattern region 131 that is a common pattern is a pattern indicating a periphery of the entire video in each of the stripe patterns a1 to a4 shown at the left side of FIG. 3, and is generated by the measurement pattern generator 116.

A width of the common pattern region 131 is not limited particularly. However, the common pattern region 131 may have a width enough to be photographed when projected video (will be described later) is photographed by the camera 122 of FIG. 2. The common pattern region 131 forms a common region in each of the stripe patterns a1 to a4. In other words, in the stripe patterns a1 to a4, an area of the common pattern region 131 is the same as each other.

Here, a video level of the common pattern region 131 is white or high luminance. All of the region 130, the region 133, and the common pattern region 131 are white or high luminance. However, the regions may have the same luminance level, or a luminance level may be changed for the regions so long as the periphery of the entire video can be detected.

Second Example of Stripe Pattern

Figure 4:
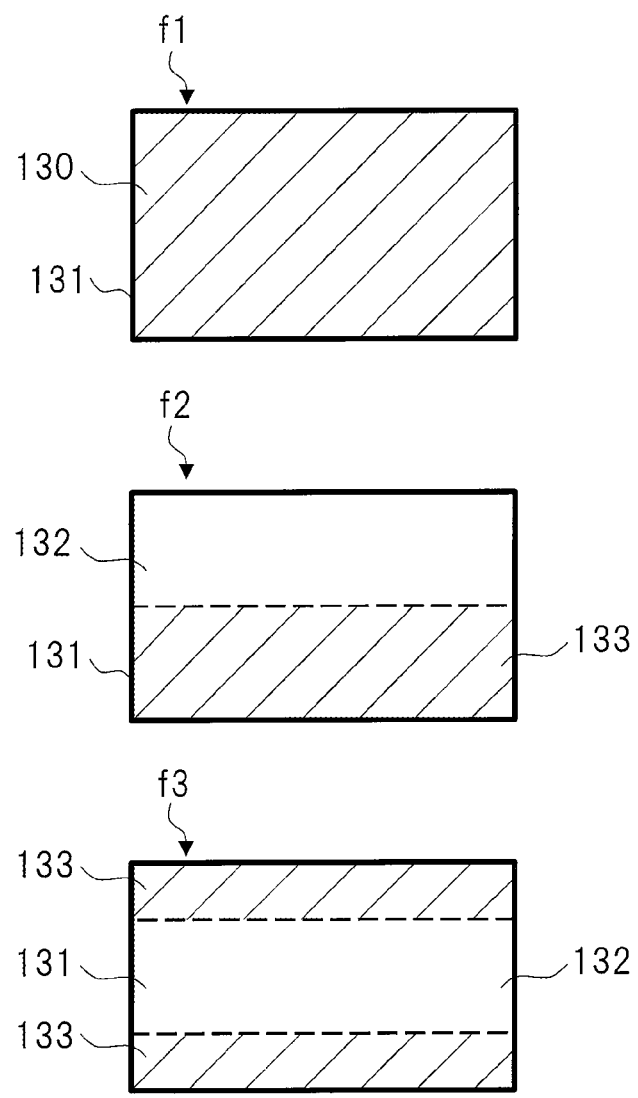
FIG. 4 is an explanatory drawing showing another example of the stripe patterns that are generated by the measurement pattern generator included in the projector shown in FIG. 2.

FIG. 4 is an explanatory drawing showing another example of the stripe patterns that are generated by the measurement pattern generator 116 included in the projector 101 shown in FIG. 2. FIG. 4 shows one example of the stripe patterns in a horizontal direction, which are generated by the measurement pattern generator 116.

In FIG. 4, in a stripe pattern f1 provided at the uppermost side, the entire video is formed by a region 130 that is white or high luminance. In a stripe pattern f2 shown under the stripe pattern f1, lower half of the video is formed by a region 133 that is white or high luminance, and upper half of the video is formed by a region 132 that is black or low luminance.

In a stripe pattern f3 shown under the stripe pattern f2, upper and lower sides of the video are respectively formed by the regions 133 that are white or high luminance, and a central portion of the video is formed by the region 132 that is black or low luminance.

Further, in each of these stripe patterns f1 to f3, a common pattern region 131 is formed at a periphery thereof as well as the stripe patterns b1 to b4 shown at the right side of FIG. 3.

Example of Settings for Distortion Correction Coefficient

Subsequently, an example of settings for a distortion correction coefficient to correct projection distortion will be described.

Figure 5:
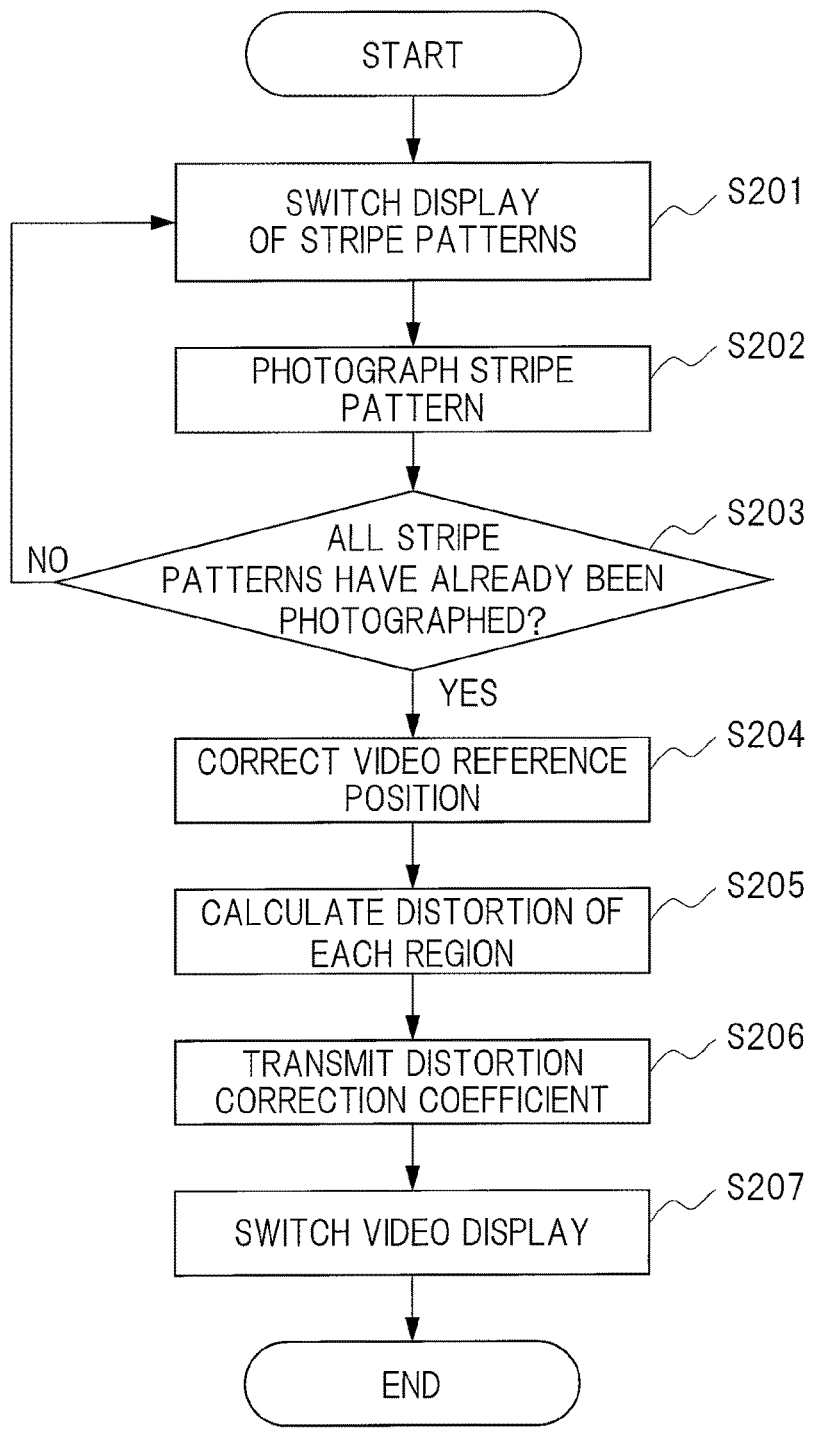
FIG. 5 is a flowchart showing one example of a setting process for a distortion correction coefficient to correct projection distortion by the video display system shown in FIG. 2.

FIG. 5 is a flowchart showing one example of a setting process for the distortion correction coefficient to correct the projection distortion by the video display system shown in FIG. 2.

In FIG. 5, the smartphone 102 detects distortion of video projected from the projector 101, calculates and sets a distortion correction coefficient. The CPU 120 executes these processes on the basis of the distortion correcting application, which is an application stored in the memory 121 shown in FIG. 2.

An operator first connects the projector 101 to the smartphone 102 by means of wireless communication in advance. This wireless communication is realized as wireless connection by the wireless transceiver 117 of the projector 101 and the wireless transceiver 124 of the smartphone 102.

The operator then starts the distortion correcting application installed in the smartphone 102, and presses a start button for distortion correction in a state where the operator holds the smartphone 102 so that video projected by the projector 101 falls in a photographing range of the camera 122, which is displayed on the display 123. As described above, it becomes a state where distortion correction start is instructed.

Hereinafter, explanation will be made along a flowchart shown in FIG. 5.

When start of the distortion correction described above is instructed by the smartphone 102, a generating instruction for a measurement pattern is transmitted from the CPU 120 of the smartphone 102 to the microcomputer 114 of the projector 101. This generating instruction is transmitted from the wireless transceiver 124 of the smartphone 102 via the wireless transceiver 117 of the projector 101.

The microcomputer 114 that received this generating instruction causes the measurement pattern generator 116 to generate the stripe pattern b1 shown at upper right of FIG. 3 (Step S201). The stripe pattern b1 is a first measurement pattern.

The stripe pattern generated by the measurement pattern generator 116 is outputted as projection video of the projector 101 from the video input unit 110 through the video processor 111, the distortion corrector 112, and the optical system 113. At this time, the distortion corrector 112 is in an initial state in which distortion correction is not carried out.

When a photographing instruction is outputted from the CPU 120 of the smartphone 102 to the camera 122, video of the stripe pattern projected from the projector 101 to a projection target is photographed (Step S202). The video photographed by the camera 122 is stored in the memory 121.

The CPU 120 confirms whether all of the stripe patterns have already been photographed by the camera 122 or not (Step S203). In a case where it is confirmed that all of the stripe patterns have not been photographed yet, the processing flow returns to the process at Step S201, and the measurement pattern generator 116 switches a next stripe pattern.

The processes at Steps S201 to S203 repeat until all of the stripe patterns, that is, all of the stripe patterns b1 to b4 shown in FIG. 3 and the stripe patterns f1 to f3 shown in FIG. 4 are photographed. Then, when all of the stripe patterns are photographed, the processing flow shifts to a next process at Step S204.

In a case where it is determined in the process at Step S203 that all of the stripe patterns are photographed, the CPU 120 of the smartphone 102 executes correction of a video reference position for video of each of a plurality of stripe patterns photographed in the processes at Steps S201 to S203 (Step S204).

Example of Correcting Process for Video Reference Position

Here, a correcting process for the video reference position will be described.

FIG. 6 is an explanatory drawing showing one example of correction of the video reference position, which is the process at Step S204 in FIG. 5.

FIG. 6(a) shows video obtained by photographing the stripe pattern b1 shown in FIG. 3 in the process at Step S202 in FIG. 5. Similarly, FIG. 6(b) shows video obtained by photographing the stripe pattern b2 shown in FIG. 3 in the process at Step S202 in FIG. 5.

Since the operator holds the smartphone 102 by his or her hands as described above, a position of photographed video of each of the stripe patterns may shift to each other slightly as shown in FIG. 6(a) and FIG. 6(b). FIG. 6(b) shows a state where the photographed video of the stripe pattern b2 shifts with respect to the position of the photographed video of the stripe pattern b1, which is shown by a dotted line.

In correction of the video reference position that is the process at Step S204, a position of the photographed video with the stripe pattern shown in FIG. 6(b) is corrected on the basis of the position of the photographed video shown in FIG. 6(a) so that the video of the stripe pattern b1 overlaps with the video of the stripe pattern b2. FIG. 6(c) shows a state after the videos of the stripe patterns b1, b2 are corrected.

As described above, the CPU 120 executes this process with respect to all kinds of the photographed video stored in the memory 121. Specifically, it is realized by extracting a periphery of the video from the common pattern region 131 formed in the stripe pattern, and adding correction thereto so that a peripheral position of the video is the same as that of the photographed video shown in FIG. 6(a).

As described above, in the detecting process for the periphery of the video, it is possible to increase a difference of brightness between a region in which no video is projected and a boundary of a peripheral region of the video projected by the projector 101 by causing the video in the common pattern region 131 to be high luminance. For this reason, it is possible to facilitate the detecting process for a peripheral portion of the projection video.

Here, the process at Step S204 in FIG. 5 is executed by the CPU 120. However, the process at Step S204 may be executed by the microcomputer 114 of the projector 101, for example.

In that case, the video with the stripe pattern, which is photographed in the process at Step S202 in FIG. 5, is transmitted to the microcomputer 114 whenever the video is photographed by the camera 122 of the smartphone 102, and is stored in the memory 115, for example.

Subsequently, when correction of the video reference position, which is the process at Step S204, is terminated in FIG. 5, the CPU 120 of the smartphone 102 calculates distortion of each region of the video (Step S205), and calculates the distortion correction coefficient to correct distortion of the projection video of the projector 101.

FIG. 7 is an explanatory drawing showing one example of the process at Step S205 in FIG. 5.

In order to calculate distortion for each region, a correction region is first determined. This correction region is determined by a boundary between the region 132 with black or low luminance and the region 133 with white or high luminance. In a case where the four stripe patterns in the vertical direction shown in FIG. 3 and the three stripe patterns in the horizontal direction shown in FIG. 4 are used, as shown by dotted lines of FIG. 7, the video in the horizontal direction is divided into eight regions, and the video in the vertical direction is divided into four regions. This causes the video to be divided into 32 correction regions.

Example of Dividing Process for Correction Region

This dividing process for the correction region will be described.

Figure 8:
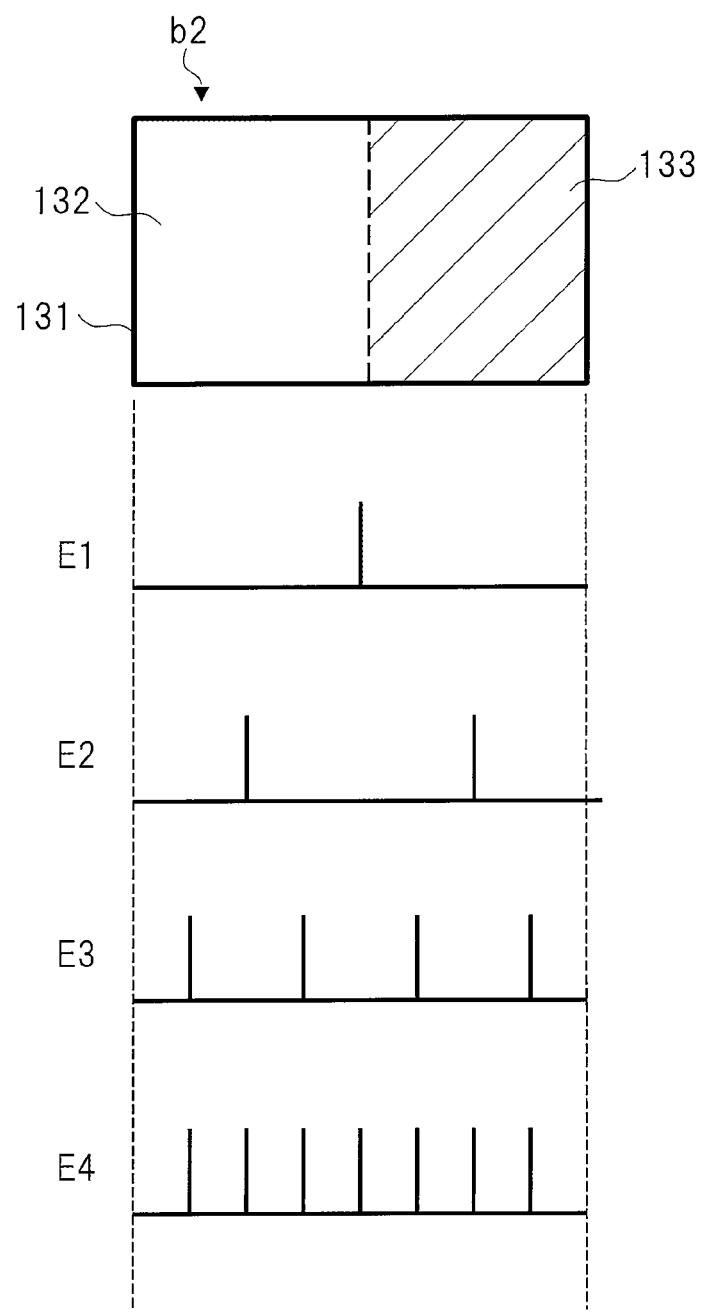
FIG. 8 is an explanatory drawing showing one example of a process of dividing a correction region shown in FIG. 7.

FIG. 8 is an explanatory drawing showing one example of the process of dividing the correction region shown in FIG. 7.

A stripe pattern b2 shown at the uppermost of FIG. 8 is the same as the stripe pattern b2 shown in FIG. 3. There is a boundary between light and dark in the horizontal direction at a central portion of the screen in the stripe pattern b2. A result when to detect a boundary position of this stripe pattern b2 is a detected result E1 shown under the stripe pattern b2.

As stated above, the change in the luminance level may occur on the boundary in the stripe pattern. Thus, for example, by carrying out a highpass filtering process for the video signal to convert it into absolute values, it is possible to obtain the detected result E1. Similarly, detected results E2, E3 respectively indicate results when to detect boundaries from the stripe pattern b3 and the stripe pattern b4 shown in FIG. 3.

A detected result E4 is obtained by superposing the boundaries of these detected results E1 to E3. In this case, as shown in the detected result E4, the video divided into eight regions in the horizontal direction is obtained. The distortion correction for each region is executed by using these divided regions of the detected result E4 as video correction regions.

Similarly, the video divided into four regions in the vertical direction is obtained by using the stripe patterns f1 to f3 shown in FIG. 4. Herewith, the video is divided into 32 correction regions.

Here, explanation returns to FIG. 7. FIG. 7 (a) shows video with the pattern divided into the 32 regions as described above. FIG. 7(b) shows an example of the video with the 32-divided pattern formed by photographing the video projected from the projector 101 as shown in FIG. 7(a) by means of the smartphone 102.

In the example of FIG. 7(b), the case where a projection plane to which the video is projected from the projector 101 is not flat and the center thereof becomes hollow is shown. In this case, coordinates p11, p12, p21, p22 are respectively assigned to intersection points of the regions of the video shown in FIG. 7(a).

In the case of FIG. 7(b), since the projection plane is not flat as described above, the coordinates p11, p12, p21, p22 shown in FIG. 7(a) respectively correspond to distorted positions.

Thus, in order to correct the distortion shown in FIG. 7 (b) and deform the projection video to a rectangle, correction is applied on the basis of the coordinates of the respective regions. For example, by applying distortion correction shown in FIG. 7 (d) to the distortion shown in FIG. 7(b) to correct the same, it is possible to obtain rectangular video after correction shown in FIG. 7(e).

This process includes: first seeking a rectangular region, that becomes the maximum area shown in FIG. 7(c), from displayed video shown in FIG. 7(b); and generating a distortion correction coefficient so as to fall within this range. This makes it possible to obtain the display video shown in FIG. 7(e).

In such a case, the rectangular region described above is not always the same aspect ratio as that of the original video depending upon a shape of the projection plane. Thus, the distortion correction coefficient may be obtained so as to become the whole rectangular region, and the video may be displayed by changing the aspect ratio of the video. Alternatively, the distortion correction coefficient may be set so as to maintain the aspect ratio of the video. Each of the processes described above is also executed by the CPU 120 of the smartphone 102. As described above, the process at Step S205 is terminated.

Here, the CPU 120 of the smartphone 102 also executes the process at Step S205. However, the microcomputer 114 of the projector 101 may execute the process at Step S205.

This makes it possible to reduce a load on the CPU 120 of the smartphone 102. Therefore, it becomes possible to reduce power consumption of the smartphone 102, whereby an effect to reduce consumption of a battery of the smartphone 102 can be obtained. In a case where the microcomputer 114 of the projector 101 executes the process at Step S204 in FIG. 5 described above, it is also possible to achieve the similar effect.

Subsequently, in FIG. 5, the smartphone 102 transmits the distortion correction coefficient calculated in the process at Step S205, which is a distortion correction parameter, to the projector 101 via the wireless transceiver 124 (Step S206). The projector 101 sets the distortion correction coefficient to the distortion corrector 112 via the wireless transceiver 117 and the microcomputer 114.

When the distortion correction coefficient is set to the distortion corrector 112, the microcomputer 114 switches video to be taken in the video input unit 110 to inputted video (Step S207).

The setting process for the distortion correction is terminated by these processes.

As described above, it is possible to reduce an influence such as camera shake at the time of photographing a stripe pattern that is a measurement pattern. As a result, it is possible to carry out correction of video with high accuracy.

Further, it is possible to require no tool to fix the smartphone, such as a tripod, when the stripe pattern is photographed. Therefore, it is possible to improve convenience.

Second Embodiment

Outline

In the first embodiment, as shown in FIG. 3, the common pattern region 131 has been used as a pattern indicating a periphery of the entire video. However, there is the case where a common pattern region is to be changed depending upon presence or absence of each of a shape, color, a pattern of a projection plane. In a second embodiment, another example of the common pattern region 131 will be described.

Example of Common Pattern Region

Figure 9:
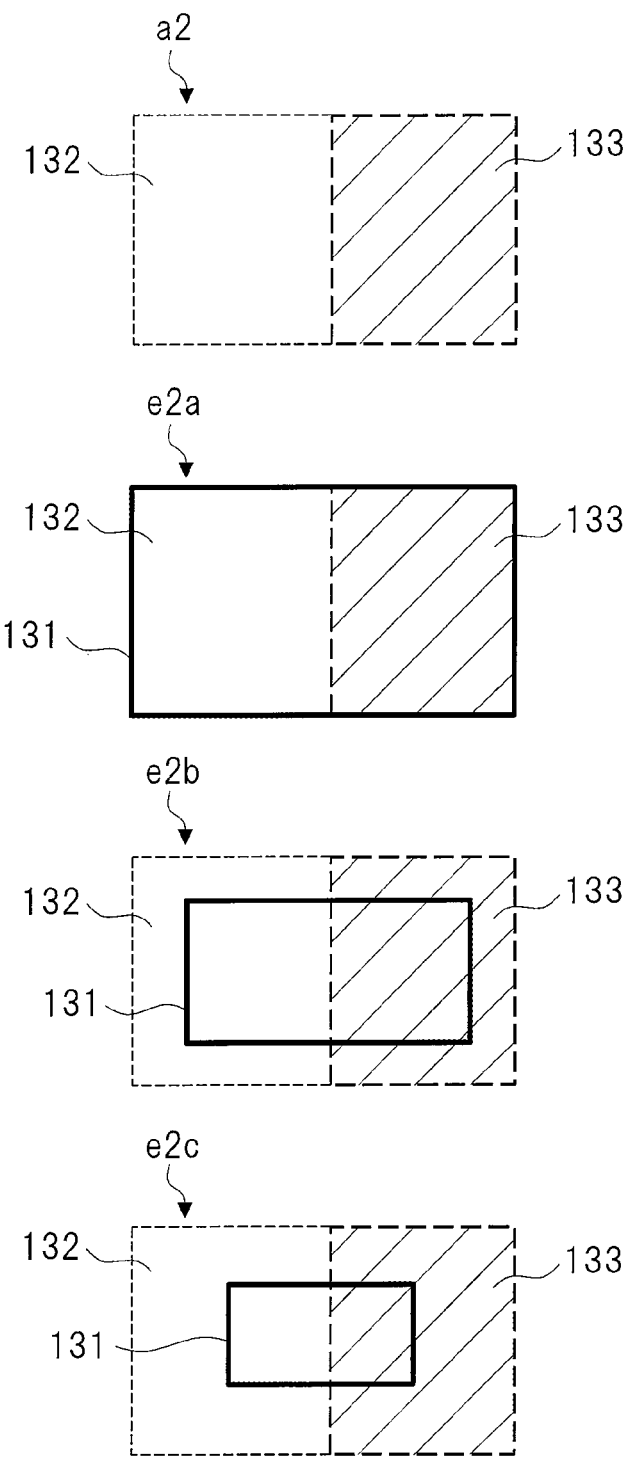
FIG. 9 is an explanatory drawing showing one example of a common pattern region that is formed in a stripe pattern according to a second embodiment.

FIG. 9 is an explanatory drawing showing one example of the common pattern region that is formed in the stripe pattern according to the second embodiment.

A stripe pattern a2 shown at the uppermost of FIG. 9 shows a stripe pattern before a common pattern region is added thereto, and is the same as the stripe pattern a2 shown in FIG. 3 according to the first embodiment.

Stripe patterns e2a, e2b, e2c shown under the stripe pattern a2 respectively show new examples in each of which a common pattern region 131 is provided in the stripe pattern a2.

The stripe pattern e2a is similar to the stripe pattern b2 shown in FIG. 3, and a common pattern region 131 is provided on a periphery of video in the stripe pattern e2a. The stripe pattern e2b under the stripe pattern e2a show an example in which a common pattern region 131 is not provided on the periphery of the video, but is provided at a position of 75% of each of vertical and horizontal lengths with respect to the center of the video, for example.

Further, the stripe pattern e2c shown under the stripe pattern e2b shows an example in which a common pattern region 131 is provided at a position of 50% of each of vertical and horizontal lengths with respect to the center of the video, for example.

For example, depending upon the shape of the projection plane, a blind area when viewed from the camera 122 shown in FIG. 2 may occur when projected video is photographed. In that case, a user switches common pattern regions so as to become the optimum position, whereby it is possible to set the distortion correction while avoiding any blind area of the video due to a position of the camera 122.

If it can be known at which position on a screen the common pattern region 131 exists, it is possible to calculate the distortion correction coefficient that has been explained in the first embodiment. This switching of the common pattern region 131 may be executed by an application or the like of the smartphone 102 in FIG. 1, which has been explained in the first embodiment, for example, and may be executed at the time of start of a distortion correcting process.

Example of Setting Process for Distortion Correction Coefficient

Figure 10:
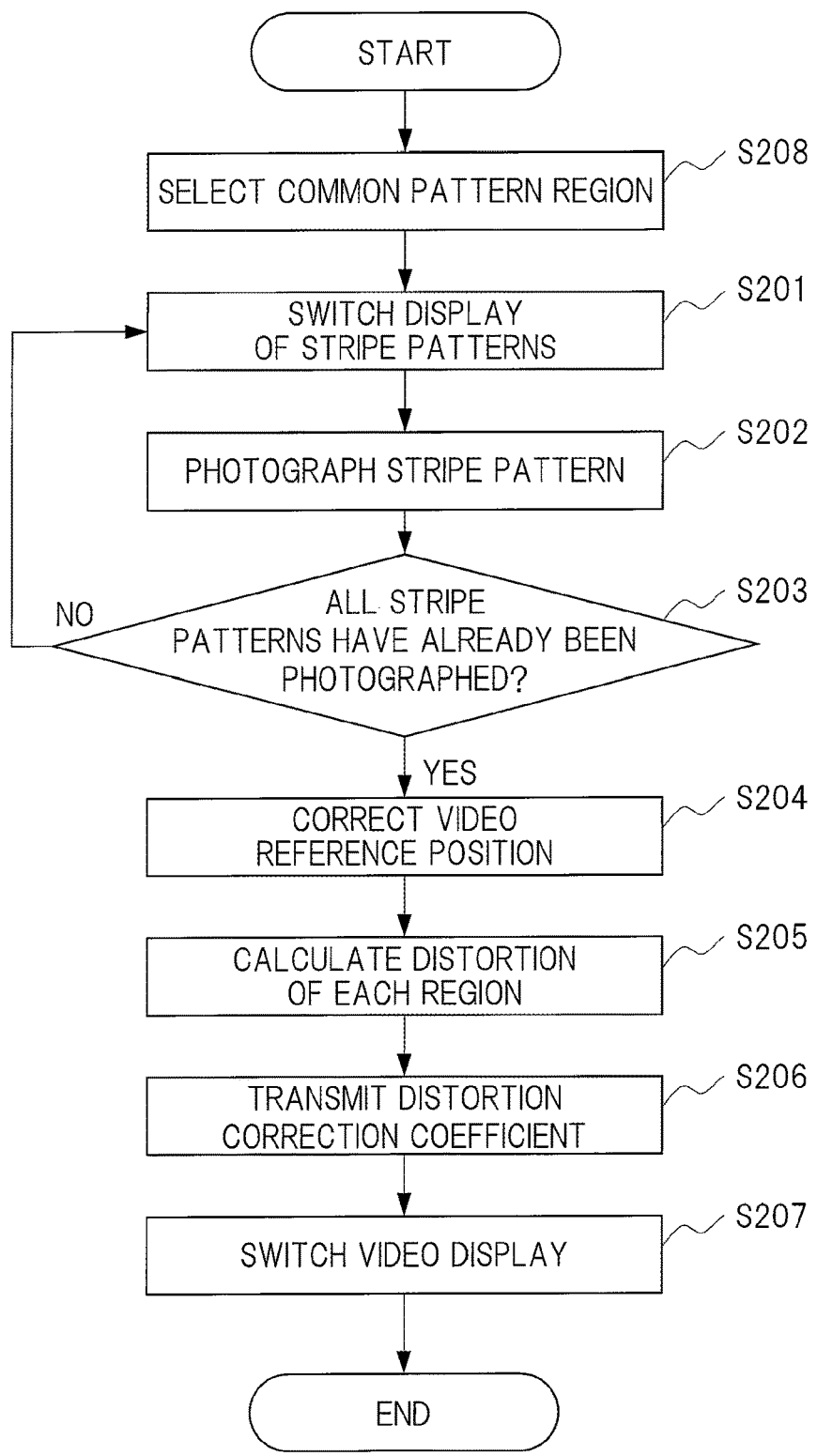
FIG. 10 is a flowchart showing one example of a setting process for a distortion correction coefficient, which includes a switching process for the common pattern region shown in FIG. 9.

FIG. 10 is a flowchart showing one example of a setting process for a distortion correction coefficient, which includes the switching process for the common pattern region 131 shown in FIG. 9.

In the case of a setting process by the flowchart show in FIG. 10, a process at Step S208 is newly added thereto with respect to the flowchart shown in FIG. 5 according to the first embodiment. Note that hardware is the same configuration shown in FIG. 2.

This process at Step S208 is added to the setting process for the distortion correction coefficient as a first step. First, when a pattern of the stripe pattern e2a shown in FIG. 9 is displayed, the user confirms the screen of the smartphone 102 to confirm whether the entire video is included in a photographing range or not.

Here, in a case where the video of the projector 101 lacks due to the blind area described above or the like, the user carries out a switching operation for the common pattern region 131 so that the common pattern region 131 does not lack (Step S208).

This operation allows the user to set distortion correction in which any blind area is avoided. Note that the processes after Step S208, that is, the processes at Steps S201 to S207 in FIG. 10 are similar to the processes at Steps S201 to S207 in FIG. 5. Therefore, its explanation is omitted.

In the explanation described above, one example has been shown in which any one is selected, as the position of the common pattern region 131, from three stages of the periphery of the video, which include the position of 75% of each of the vertical and horizontal lengths with respect to the center of the video, and the position of 50% of each of the vertical and horizontal lengths with respect to the center of the video. However, the position of the common pattern region 131 is not limited to these examples, the position may be switched by a finer interval.

Further, the case where the user carries out the confirmation of the photographing range of the common pattern region 131 and the switching operation has been described in FIG. 10. However, the CPU 120 of the smartphone 102 may determine whether the common pattern region 131 is included in the photographing range or not and whether a video region can be discriminated or not. In the determination of whether the video region can be discriminated or not, the CPU 120 determines a luminance level or color level of the common pattern region 131, and determines that the video region cannot be discriminated in a case where any level is not more than a threshold value set in advance, for example.

Then, in a case where the video region cannot be discriminated, for example, an alert may be outputted. The alert is an alarm and display by which the user is encouraged to switch, for example. The display by which the user is encouraged to switch allows the user to select a suitable stripe pattern and a suitable common pattern region.

Moreover, in addition to this, the CPU 120 of the smartphone 102 automatically executes the switching of common pattern regions, whereby it is possible to further improve usability of the user. In this case, when the alert is to be outputted, the CPU 120 transmits, to the measurement pattern generator 116 through the wireless transceivers 124, 117, a control signal to change at least any one of the luminance, the color, or the position of the common pattern region 131. The measurement pattern generator 116 that receives this control signal changes at least any one of the luminance, the color, or the position of the common pattern region 131.

As described above, it is possible to reduce a lack (or failure) of the common pattern region 131 caused by the shape of the projection plane. Therefore, it is possible to execute distortion correction with higher accuracy.

Third Embodiment

Outline

In the first and second embodiments, the example in which the common pattern region is provided in a picture frame manner has been described. However, in a third embodiment, another example of a shape of a common pattern region 131 will be described.

Example of Common Pattern Region

Figure 11:
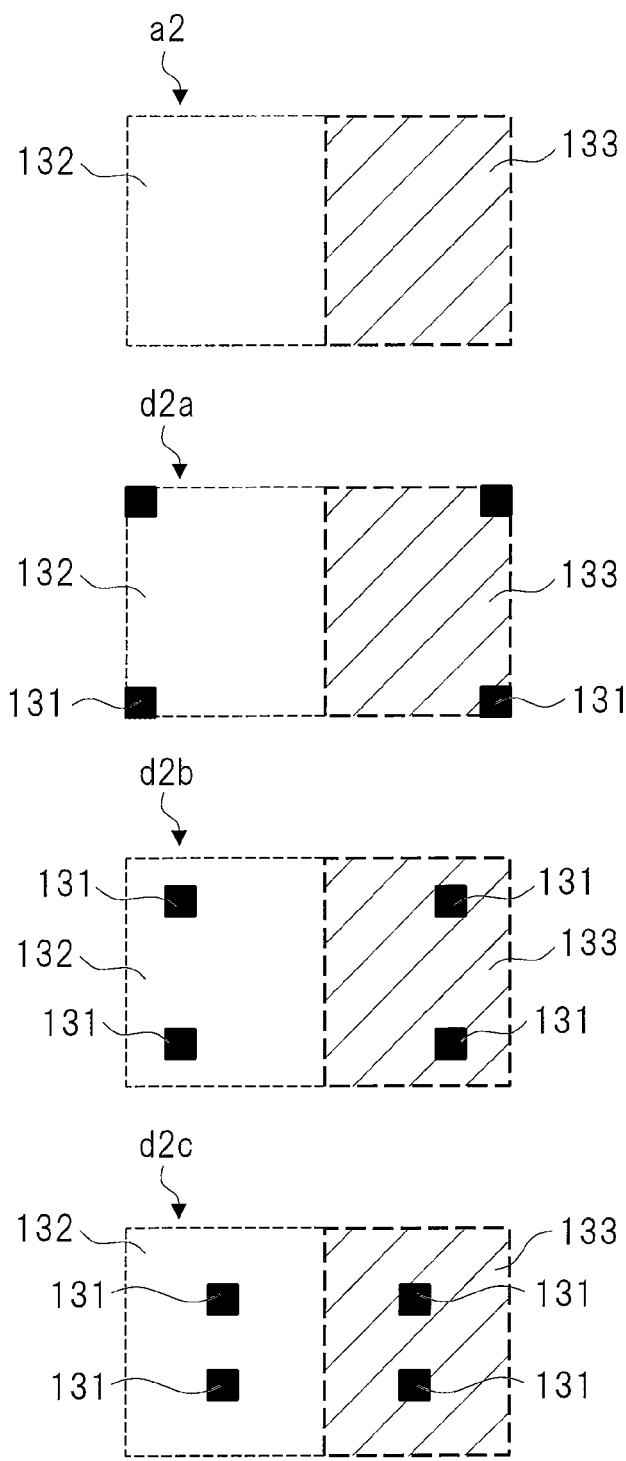
FIG. 11 is an explanatory drawing showing one example of a common pattern region formed in a stripe pattern according to a third embodiment.

FIG. 11 is an explanatory drawing showing one example of a common pattern region formed in a stripe pattern according to the third embodiment.

A stripe pattern a2 shown at the uppermost of FIG. 11 is the same as the stripe pattern a2 shown in FIG. 3 according to the first embodiment. Stripe patterns d2a to d2c shown under the stripe pattern a2 respectively show new examples in each of which common pattern regions 131 are provided in the stripe pattern a2.

In the case of the stripe pattern d2a, a common pattern region 131 is provided at each of positions of four corners on the right, left, top and bottom of video. Each of the common pattern regions 131 is configured by a punctiform quadrangle. Further, in the stripe pattern d2b shown under the stripe pattern d2a, the common pattern regions 131, each of which is configured by the punctiform quadrangle, are respectively provided at corresponding positions of 75% of each of vertical and horizontal lengths with respect to the center of the video.

In the striper pattern d2c shown under the stripe pattern d2b, the common pattern regions 131, each of which is configured by the punctiform quadrangle, are respectively provided at corresponding positions of 50% of each of vertical and horizontal lengths with respect to the center of the video.

In this case, a user is allowed to select any of the stripe patterns d2a to d2c in view of the blind area of the camera 122 shown in FIG. 2 to carry out setting of distortion correction as well as the example that has been explained in the second embodiment.

Further, color of the common pattern region 131 may be changed in addition to luminance. Moreover, the common pattern region 131 may be configured so that color thereof can be selected. By allowing the color to be selected, it is possible to discriminate regions by not only using a level difference in luminance between a common pattern region in video photographed when the video is projected to a projection plane with color and the other region, but also using a level difference in color thereof. This makes it possible to improve detection accuracy of distortion.

Example of Screen Display

Figure 12:
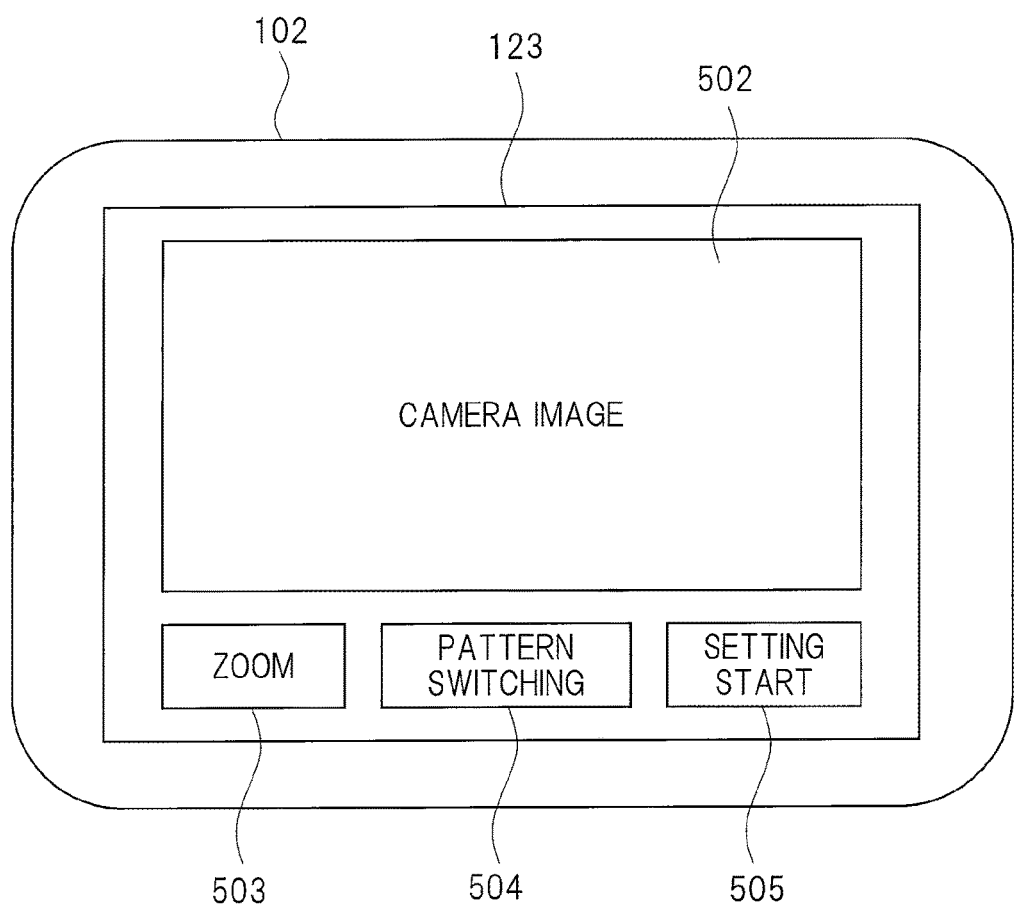
FIG. 12 is an explanatory drawing showing one example of screen display when the common pattern region shown in FIG. 11 is switched.

FIG. 12 is an explanatory drawing showing one example of screen display when the common pattern regions shown in FIG. 11 are switched. Here, the smartphone 102 has the similar configuration to that shown in FIG. 2.

As shown in FIG. 12, an application screen to set distortion correction described above is displayed on a display 123. In the display on the display 123, there is a display region 502 for displaying video photographed by a built-in camera at an upper portion of the display 123.

A zoom button 503 for a camera 122 is displayed at a lower left portion of the display region 502. A pattern switching button 504 for switching display of the common pattern region 131 is displayed at a right side of the zoom button 503.

Further, a start button 505 to start setting of distortion correction is displayed at a right side of the pattern switching button 504. The pattern switching button 504 described above may be configured so as to include a plurality of button displays such as "size switching", "luminance switching", "color switching", or "auto", that is, a menu, for example.

As described above, it is possible to switch a size, luminance, or color of the common pattern region 131. Therefore, it becomes possible to cause the user to recognize the common pattern region 131 successfully, and this makes it possible to improve detection accuracy of distortion.

In this regard, the present invention is not limited to the embodiments described above, and various modifications are contained. For example, the embodiments described above have been explained in detail for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby.

REFERENCE SINGS LIST

101 projector
102 smartphone
103 screen
110 video input unit
111 video processor
112 distortion corrector
113 optical system
114 microcomputer
115 memory
116 the measurement pattern generator
117 wireless transceiver
121 memory
122 camera
123 display
124 wireless transceiver
131 common pattern region

The invention claimed is:

1. A display system comprising:
a video display apparatus; and
a mobile terminal configured to communicate with the video display apparatus,
wherein the video display apparatus includes:
a measurement pattern generator configured to generate a plurality of measurement patterns;
a projection unit configured to project the plurality of measurement patterns generated by the measurement pattern generator;
a first transceiver configured to communicate with the mobile terminal to receive information regarding distortion correction of video from the mobile terminal; and
a distortion corrector configured to correct distortion of the video projected by the projection unit on a basis of the information regarding the distortion correction of the video, which is received from the mobile terminal,
wherein the mobile terminal includes:
a camera unit configured to photograph the plurality of measurement patterns projected by the projection unit;
a controller configured to generate the information regarding the distortion correction of the video on a basis of the plurality of measurement patterns photographed by the camera unit; and
a second transceiver configured to communicate with the first transceiver to transmit, to the video display apparatus, the information regarding the distortion correction of the video, which is generated by the controller,
wherein the measurement pattern generator is configured to add a common pattern to each of the plurality of measurement patterns, the common pattern indicating a reference position of each of the measurement patterns, and
wherein the controller is configured to generate the information regarding the distortion correction of the video on a basis of the common pattern added to each of the plurality of measurement patterns.

2. The display system according to claim 1,
wherein a change in an imaging position of an image of each of the plurality of measurement patterns photographed by the camera unit is compensated in the controller by using the common pattern added by the measurement pattern generator.

3. The display system according to claim 1,
wherein the mobile terminal further includes:
a common pattern processor configured to generate a menu that allows luminance, color, and a position of the common pattern to be selected therethrough; and
a display configured to display the menu generated by the common pattern processor, and
wherein the measurement pattern generator is configured to change the common pattern in accordance with a selection result of the menu received by the mobile terminal.

4. The display system according to claim 3,
wherein the controller is configured to determine whether the common pattern can be discriminated or not when the camera unit photographs the measurement pattern, and output an alert in a case where the controller determines that the common pattern cannot be discriminated.

5. The display system according to claim 4,
wherein the common pattern processor is configured to generate, when the controller outputs the alert, a menu that allows at least any one of the luminance, the color, or the position of the common pattern to be switched therethrough.

6. The display system according to claim 4,
wherein the controller is configured to transmit, when the alert is outputted, a control signal to the measurement pattern generator, the control signal indicating that at least any one of the luminance, the color, or the position of the common pattern is to be changed, and
wherein the measurement pattern generator is configured to change at least any one of the luminance, the color, or the position of the common pattern on a basis of the control signal transmitted by the controller.

7. An information processing method executed by a display system, the display system comprising:
a video display apparatus; and
a mobile terminal provided with a camera unit configured to photograph video,
the information processing method comprising:
generating a plurality of measurement patterns by the video display apparatus;
adding a common pattern to each of the plurality of measurement patterns by the video display apparatus, the common pattern indicating a reference position of each of the measurement patterns;
projecting the plurality of measurement patterns to each of which the common pattern is added by the video display apparatus;
generating information regarding distortion correction of video by the mobile terminal on a basis of the plurality of measurement patterns projected by the video display apparatus and photographed by the camera unit;
transmitting, to the video display apparatus, the generated information regarding the distortion correction of the video by the mobile terminal; and
correcting distortion of video to be projected on a basis of the received information regarding the distortion correction of the video by the video display apparatus,
wherein the generating the information regarding the distortion correction of the video includes calculating a distortion correction coefficient on a basis of the common pattern to be added to each of the plurality of measurement patterns.

8. The information processing method according to claim 7,
wherein at least any one of luminance or color of the common pattern to be added to each of the measurement patterns is different from that of each of the measurement patterns.

9. The information processing method according to claim 7, further comprising:
generating a menu by the mobile terminal, the menu allowing luminance, color, and a position of the common pattern to be selected therethrough;
displaying the generated menu by the mobile terminal; and
changing the common pattern in accordance with a selection result of the menu transmitted from the mobile terminal by the video display apparatus.

10. The information processing method according to claim 8, further comprising:
determining whether the common pattern can be discriminated or not by the mobile terminal when the measurement pattern is photographed; and
outputting an alert by the mobile terminal in a case where it is determined that the common pattern cannot be discriminated.

11. The information processing method according to claim 10, further comprising:

generating a menu by the mobile terminal when the alert is outputted, at least any one of the luminance, the color, or the position of the common pattern being allowed to be switched through the menu.

12. The information processing method according to claim 10, further comprising:

transmitting a control signal to the video display apparatus by the mobile terminal when the alert is outputted, the control signal indicating that at least any one of the luminance, the color, or the position of the common pattern is to be changed; and changing, by the video display apparatus, at least any one of the luminance, the color, or the position of the common pattern on a basis of the control signal transmitted by the mobile terminal.

* * * * *